United States Patent [19]

Kapaan et al.

[11] Patent Number: 4,458,958
[45] Date of Patent: Jul. 10, 1984

[54] OBJECT CONSISTING OF AT LEAST TWO PARTS MOVABLE RELATIVE TO ONE ANOTHER ONE OF WHICH IS SUBSTANTIALLY ENCLOSED WITHIN THE OTHER

[76] Inventors: Hendrikus J. Kapaan, Waterhoen 5, Nieuwegein; Martin B. Verburgh, Bischopsweg 212, Amersfoort, both of Netherlands

[21] Appl. No.: 353,070

[22] Filed: Mar. 1, 1982

Related U.S. Application Data

[62] Division of Ser. No. 98,535, Nov. 29, 1979, Pat. No. 4,330,911.

[30] Foreign Application Priority Data

Nov. 27, 1978 [NL] Netherlands .................... 7811624

[51] Int. Cl.³ ............................................. F16C 19/08
[52] U.S. Cl. ..................... 308/189 A; 29/148.4 A
[58] Field of Search ............... 308/189 A, 196, 195, 308/193, 213, 214, 216, 207 A, 207 R; 29/148.4 A

[56] References Cited

U.S. PATENT DOCUMENTS

| | | | |
|---|---|---|---|
| 2,625,450 | 1/1953 | Ringsmith | 308/213 |
| 4,203,635 | 5/1980 | Reiter | 308/213 |
| 4,336,971 | 6/1982 | Reiter | 308/214 |

FOREIGN PATENT DOCUMENTS 2712539 10/1977 Fed. Rep. of Germany.

Primary Examiner—Lenard A. Footland

[57] ABSTRACT

An object comprising at least two parts movable relative to one another, one of said parts being substantially enclosed within the other and one of the parts being made in at least two separate pieces and adapted to be held side by side in relation to the other part and secured together, a plurality of loose members in the space between the parts which are introduced at the time of positioning the separate pieces prior to being secured together, said parts being annular, and the parting line of said separate pieces lying in a plane perpendicular to the axis of revolution of said one part and means defining an opening in the other part extending radially therethrough and facing said parting line in the assembled condition.

5 Claims, 3 Drawing Figures

U.S. Patent  Jul. 10, 1984  4,458,958
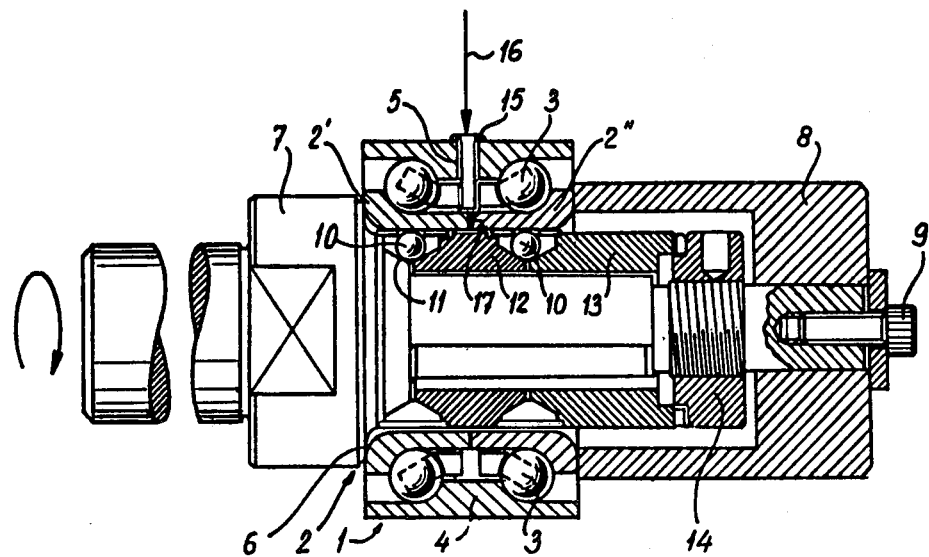
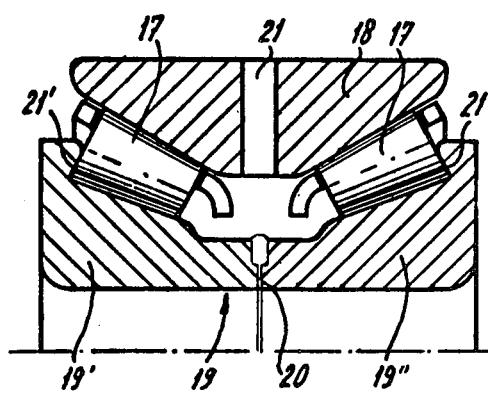 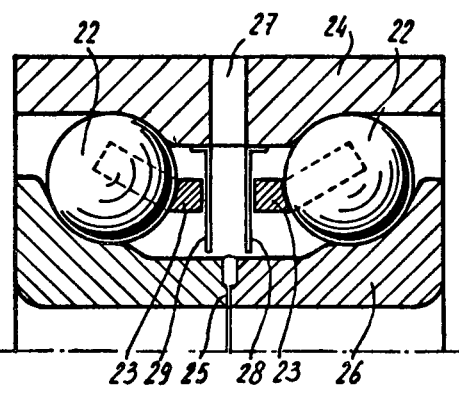

OBJECT CONSISTING OF AT LEAST TWO PARTS MOVABLE RELATIVE TO ONE ANOTHER ONE OF WHICH IS SUBSTANTIALLY ENCLOSED WITHIN THE OTHER

CONTINUING DATA

This application is a division of Ser. No. 06/098,535, filed 11-29-79, now U.S. Pat. No. 4,330,911.

BACKGROUND AND SUMMARY OF THE INVENTION

The invention relates to a process for production of an object consisting of at least two parts movable relative to each other, one of which or a portion thereof is substantially enclosed within the other.

Specifically, the invention is addressed to a process for production of such an object wherein one or more loose members are enclosed between the two parts of the object.

In the production of such objects, the placement of the members between the parts presents a difficult problem.

This problem has now been solved by making one of the parts in at least two separate pieces, placing these pieces against each other and holding them in the correct position in relation to the other part, setting up a high energy beam welding means such as a laser or electron beam over the parting line between the two pieces, and putting it in operation, at least the said two pieces being moved bodily in order to move the parting line along the energy beam and weld the two pieces together, the members being emplaced at the time of moving the two pieces of the one part together into the correct position in relation to the other part.

German Letters of Disclosure No. 2,712,539 do disclose a process for production of a self-aligning friction bearing consisting of a sleeve having a spherical outer surface inside an annular casing with a matching spherical inner surface, the casing being composed of two pieces which are welded to each other around the sleeve by means of a stationary electron beam welding means aimed at the parting line between the said two pieces, the sleeve and the casing being rotated bodily together.

In particular, the process according to the invention may be applied to the production of objects the parts of which are annular, like sealing rings or races of antifriction bearings, the one part being made in two pieces such that the parting line lies in a plane perpendicular to the axis of rotation of the ring. The part made in two pieces may be the inner part, in which case the outer part is provided with an opening passing radially through it and located over the parting line in assembled condition, while the high energy beam welding means is placed over the outer end of the opening so that the energy beam reaches the parting line through the opening, and the two pieces of the inner part are bodily set in rotation together while the outer part is held stationary.

This latter form of the process according to the invention is especially advantageous for the production of antifriction bearings having two rows of rolling members, in which case the innermost race, constituting the inner part, is made in two pieces such that the parting line is located between the rows, so that then the inner race may be made in two parts that when these parts are brought up against each other, a prestress is applied to the rolling members.

In order to prevent spatters from sticking between the parts during the welding, and/or damage from being done by the heat of the energy beam, a small tube may be arranged in the opening in the other part, its bottom end extending to above the parting line. Preferably the tube, which is removable, consists of a material capable of catching and retaining spatters that occur during welding.

Alternatively, on opposed sides of the opening in the outermost part, two annular discs substantially parallel to each other may be attached by their outer peripheries to the inner surface of the outermost part, the inner peripheries of these discs being located on opposed sides of the parting line, over the outer surface of the innermost part. In this way, support may also be provided for the cages.

By the process according to the invention, it is in particular a very simple matter to produce an antifriction bearing, which bearing may be a full prestressed bearing unit, so that locking means such as a ring with lock nut may be dispensed with. Furthermore, a bearing with tapered rolling members may be obtained in which the inner race is provided with outer shoulders only, thus eliminating the machining required to make the inner shoulders.

DESCRIPTION OF THE DRAWING

The process according to the invention will be described in more detail with reference to the following drawings.

FIG. 1 shows a longitudinal section of a fixture for producing an antifriction bearing by the process according to the invention.

FIG. 2 shows a cross sectional view of a fully prestressed antifriction bearing according to the invention.

FIG. 3 shows a cross sectional view of another embodiment of the antifriction bearing produced according to the invention.

DESCRIPTION OF PREFERRED EMBODIMENT

As shown in FIG. 1, in building an antifriction bearing 1, the inner race 2 is made in two pieces 2' and 2", which pieces together with the rolling members 3 are placed in the correct position inside the outer race 4, which outer race 4 is provided with an opening 5, whereupon the pieces 2' and 2" are clamped between the shoulder 6 of a spindle 7 and a cup 8. By means of the screw 9, some prestress can be applied to the rolling members 3. The inner race pieces 2' and 2" are supported by balls 10 lying in channels formed between a shoulder 11 of the spindle and a sleeve 12 and an adjacent sleeve 13, which sleeves 12 and 13 are held in place by nut 14.

After the parts of the bearing 1 have thus been assembled, a tube 15 is inserted in the opening 5 of the outer race 4, and an electron beam welding means, not shown, is set up over the tube 15, so that the electron beam, indicated by the arrow 16, can reach the parting 17 between the inner race pieces 2' and 2" through the tube 15. Then the spindle 7 is set in rotation, while holding the outer race 4 stationary, so that the parting 17 is moved along past the electron beam 16 and the inner race pieces 2' and 2" are welded together.

FIG. 2 of the drawing shows a fully prestressed antifriction bearing produced according to the invention, having two rows of tapered rolling members 17 located between the outer race 18 and the inner race 19. The inner race is made in two pieces 19' and 19" connected together by a weld 20, and these pieces are provided respectively with outer shoulders 21' and 21" only. An opening 21 is arranged in the outer race 18.

FIG. 3 of the drawing shows an antifriction bearing produced according to the invention, having two rows of balls 22 in cages 23 between the outer race 24 and the inner race 26, the latter made in two pieces connected together by a weld 25. An opening 27 is arranged in the outer race 24, and on opposed sides of this opening 27, two annular discs 28 and 29 are attached to the inside of the outer race 24. These discs 28 and 29 provide support for the cages 23 as well.

What is claimed is:

1. A bearing having an outer and an inner race with rolling members in the annular space therebetween, said inner race being made of two pieces connected by a weld, two rows of rolling members in the annular space between the inner and outer races which are introduced at the time of positioning the separate inner race pieces prior to being welded together, the parting line of said separate inner race pieces lying in a plane perpendicular to the axis of revolution of said inner race and means defining an opening in the outer race extending radially therethrough and facing said parting line in the assembled condition, said bearing being a fully prestressed bearing unit with no locking means.

2. A bearing according to claim 1, in which the rolling members are tapered, characterized in that the inner race is provided with outer shoulders only.

3. A bearing having an outer and an inner race with rolling members in the annular space therebetween, said inner race being made of two pieces connected by a weld, two rows of rolling members in the annular space between the inner and outer races which are introduced at the time of positioning the separate inner race pieces prior to being welded together, the parting line of said separate inner race pieces lying in a plane perpendicular to the axis of revolution of said inner race and means defining an opening in the outer race extending radially therethrough and facing said parting line in the assembled condition, and a tube arranged in the opening in the outer race.

4. The combination comprising radially spaced inner and outer annular members, said inner member consisting of a pair of ring members adapted to be secured at their confronting inner axial end faces at a parting line and a plurality of rolling elements in the annular space between said members positioned therebetween prior to securing said inner rings at their inner confronting end faces, said parting line being located in a plane perpendicular to the axis of revolution of said ring members and means defining an opening extending radially through said outer annular member and aligned with said parting line to facilitate assembly at the parting line by electron beam welding means through said radial opening and rotation of said inner rings relative to said outer annular member and a tube in the opening.

5. A bearing comprising radially spaced inner and outer annular members, said inner member consisting of a pair of ring members secured by welding at their confronting inner axial end faces at a parting line and a plurality of rolling elements in the annular space between said members positioned therebetween prior to securing said inner rings at their inner confronting end faces, said parting line being located in a plane perpendicular to the axis of revolution of said ring members and means defining an opening extending radially through said outer annular member and aligned with said parting line to facilitate assembly at the parting line by electron beam welding means through said radial opening and rotation of said inner rings relative to said outer annular member and a tube in the opening.

* * * * *